US011667265B2

(12) United States Patent
Bielby

(10) Patent No.: US 11,667,265 B2
(45) Date of Patent: Jun. 6, 2023

(54) ACTIVATING A SECURITY MODE FOR A VEHICLE BASED ON DRIVER IDENTIFICATION

(71) Applicant: Micron Technology, Inc., Boise, ID (US)

(72) Inventor: Robert Richard Noel Bielby, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/928,811

(22) Filed: Jul. 14, 2020

(65) Prior Publication Data

US 2022/0017044 A1    Jan. 20, 2022

(51) Int. Cl.
| | |
|---|---|
| B60R 25/25 | (2013.01) |
| B60R 25/30 | (2013.01) |
| B60R 25/31 | (2013.01) |
| G06N 20/00 | (2019.01) |
| B60R 25/102 | (2013.01) |
| B60R 25/01 | (2013.01) |
| G06V 40/16 | (2022.01) |

(52) U.S. Cl.
CPC .............. B60R 25/25 (2013.01); B60R 25/01 (2013.01); B60R 25/102 (2013.01); B60R 25/305 (2013.01); B60R 25/31 (2013.01); G06N 20/00 (2019.01); G06V 40/172 (2022.01)

(58) Field of Classification Search
CPC ....... B60R 25/25; B60R 25/01; B60R 25/102; B60R 25/305; B60R 25/31; G06N 20/00; G06K 9/00288
See application file for complete search history.

(56) References Cited

U.S. PATENT DOCUMENTS 5,005,664 A * 4/1991 Hoffmann ............... B60R 25/04
                                                 70/237
5,835,022 A * 11/1998 Amano ............... G07C 9/00182
                                               340/5.72
(Continued)

FOREIGN PATENT DOCUMENTS

| EP | 2295298 B1 | 4/2015 |
|---|---|---|
| JP | 2014025223 | 2/2014 |

(Continued)

OTHER PUBLICATIONS

International Search Report and Written Opinion, PCT/US2021/040948, dated Oct. 21, 2021.

(Continued)

*Primary Examiner* — Mohamed Barakat
*Assistant Examiner* — Rufus C Point
(74) *Attorney, Agent, or Firm* — Greenberg Traurig

(57) ABSTRACT

A controller of a vehicle detects persons that are approaching the vehicle and uses sensors to collect data regarding the persons to determine whether a security risk exists. In one approach, the collected data is used to determine whether each person is associated with the vehicle. In response to determining that at least one of the persons is unknown, a security risk is evaluated based on data from monitoring of the environment of the vehicle. In response to determining that a security risk score exceeds a threshold, one or more actions for the vehicle are performed to make the vehicle more secure.

19 Claims, 3 Drawing Sheets

(56) References Cited

U.S. PATENT DOCUMENTS

| | | | | |
|---|---|---|---|---|
| 6,323,761 | B1* | 11/2001 | Son | B60R 25/305 |
| | | | | 340/426.35 |
| 9,747,795 | B1* | 8/2017 | Espinosa | G08B 15/00 |
| 10,019,904 | B1* | 7/2018 | Chan | G06Q 10/0635 |
| 10,131,323 | B1* | 11/2018 | Sterling | B60R 25/01 |
| 10,155,499 | B1* | 12/2018 | Mazaira | B60R 25/257 |
| 10,222,228 | B1* | 3/2019 | Chan | G01C 21/3667 |
| 10,665,070 | B1* | 5/2020 | Picardi | G08B 31/00 |
| 10,717,412 | B2* | 7/2020 | Abel Rayan | H04W 12/68 |
| 10,850,709 | B1* | 12/2020 | Nagata | G07C 9/00563 |
| 2002/0152010 | A1 | 10/2002 | Colmenarez et al. | |
| 2003/0222758 | A1* | 12/2003 | Willats | B60R 25/04 |
| | | | | 340/5.72 |
| 2004/0263323 | A1* | 12/2004 | Seike | B60R 25/33 |
| | | | | 340/426.1 |
| 2012/0056734 | A1* | 3/2012 | Ikeda | G08G 1/165 |
| | | | | 340/425.5 |
| 2012/0105196 | A1* | 5/2012 | Katou | B60R 25/245 |
| | | | | 340/5.64 |
| 2012/0123806 | A1* | 5/2012 | Schumann, Jr. | G06Q 40/08 |
| | | | | 705/4 |
| 2013/0006479 | A1* | 1/2013 | Anderson | G07C 9/28 |
| | | | | 701/49 |
| 2013/0033381 | A1* | 2/2013 | Breed | G08B 13/2417 |
| | | | | 340/568.1 |
| 2013/0116919 | A1* | 5/2013 | Furuhata | G08G 1/096716 |
| | | | | 701/408 |
| 2014/0379258 | A1* | 12/2014 | Beaurepaire | G01C 21/3685 |
| | | | | 701/533 |
| 2015/0081169 | A1* | 3/2015 | Pisz | H04W 4/40 |
| | | | | 701/1 |
| 2015/0336521 | A1* | 11/2015 | Tofilescu | G06V 20/56 |
| | | | | 382/104 |
| 2016/0300410 | A1 | 10/2016 | Jones et al. | |
| 2017/0023377 | A1* | 1/2017 | Burtner | G08B 13/2462 |
| 2017/0193807 | A1* | 7/2017 | Samara | H04W 4/023 |
| 2017/0316254 | A1* | 11/2017 | Hariri | G06V 40/166 |
| 2017/0355379 | A1 | 12/2017 | Hamaguchi et al. | |
| 2018/0001899 | A1* | 1/2018 | Shenoy | G07C 5/008 |
| 2018/0081048 | A1* | 3/2018 | Saitou | G01S 13/46 |
| 2018/0108369 | A1 | 4/2018 | Gross | |
| 2018/0201138 | A1* | 7/2018 | Yellambalase | B60L 53/16 |
| 2018/0201187 | A1* | 7/2018 | Yellambalase | B60L 50/51 |
| 2018/0236972 | A1* | 8/2018 | Linden | B60R 25/245 |
| 2018/0286232 | A1* | 10/2018 | Shau | G08G 1/005 |
| 2018/0306609 | A1* | 10/2018 | Agarwal | G01D 5/00 |
| 2018/0322711 | A1 | 11/2018 | Weimerskirch | |
| 2019/0044951 | A1* | 2/2019 | Zivkovic | H04L 67/535 |
| 2019/0143936 | A1* | 5/2019 | Abel Rayan | B60R 25/10 |
| | | | | 701/2 |
| 2019/0256047 | A1* | 8/2019 | Iwashita | B60R 25/245 |
| 2019/0318159 | A1 | 10/2019 | Blanc-paques et al. | |
| 2020/0086881 | A1 | 3/2020 | Abendroth et al. | |
| 2020/0090314 | A1 | 3/2020 | Mayr et al. | |
| 2020/0193005 | A1* | 6/2020 | Babala | G06V 40/172 |
| 2020/0210729 | A1* | 7/2020 | Beaurepaire | G06V 20/20 |
| 2020/0211325 | A1 | 7/2020 | Kaizerman | |
| 2020/0276959 | A1 | 9/2020 | Cho | |
| 2020/0348406 | A1* | 11/2020 | Jain | G05D 1/028 |
| 2020/0406860 | A1* | 12/2020 | Mai | B60R 25/31 |
| 2021/0192864 | A1* | 6/2021 | McKnew | G05D 1/0011 |

FOREIGN PATENT DOCUMENTS

| | | |
|---|---|---|
| JP | 2017001615 | 1/2017 |
| KR | 20070101963 | 10/2007 |
| KR | 20160112213 | 9/2016 |
| KR | 20200071201 | 6/2020 |

OTHER PUBLICATIONS

International Search Report & Written Opinion, PCT/US2021/040947, dated Nov. 1, 2021.

* cited by examiner

ACTIVATING A SECURITY MODE FOR A VEHICLE BASED ON DRIVER IDENTIFICATION

FIELD OF THE TECHNOLOGY

At least some embodiments disclosed herein relate to user identification systems in general, and more particularly, but not limited to a driver recognition system that performs one or more actions for a vehicle in response to determining a security risk.

BACKGROUND

Facial recognition is one approach often used for identifying a person. In some cases, facial recognition is used to identify a user of a product (e.g., a consumer device).

In one example, facial recognition is used to identify a user of a mobile device. The mobile device has a facial recognition sensor that projects infrared dots onto the user's face and then reads the pattern. The pattern is evaluated by a processor of the mobile device to confirm a match with the phone owner's face.

In some approaches, facial recognition identifies a person from a digital image. In one example, the digital image is captured by a camera. Facial recognition systems work by comparing selected facial features from a given image with faces within a database.

In some cases, facial recognition is used for access control or in other forms of security systems. Facial recognition has been used on mobile platforms and in robotics.

Some face recognition algorithms identify facial features by extracting features from the image of a person's face. For example, the algorithm may analyze the relative position of the person's eyes, nose, etc. These features are then used to search for other images with matching features.

Three-dimensional face recognition uses sensors to capture information about the shape of a face. An advantage of three-dimensional face recognition is that it is not affected by changes in lighting and can identify face from a range of viewing angles, including a profile view. Also, using three-dimensional data points from a face significantly improves the precision of the recognition.

In one approach, three-dimensional images are captured by using three tracking cameras that point at different angles. A first of the cameras points at the front of the subject, a second camera points to the side, and a third camera points at an angle. All of the cameras work together to track the subject's face in real-time, and to detect and recognize the subject.

In some cases, facial recognition technology learns from changes in a user's appearance. In one example, such technology can identify the user even when the user is wearing hats, scarves, glasses, sunglasses, a beard, or makeup.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
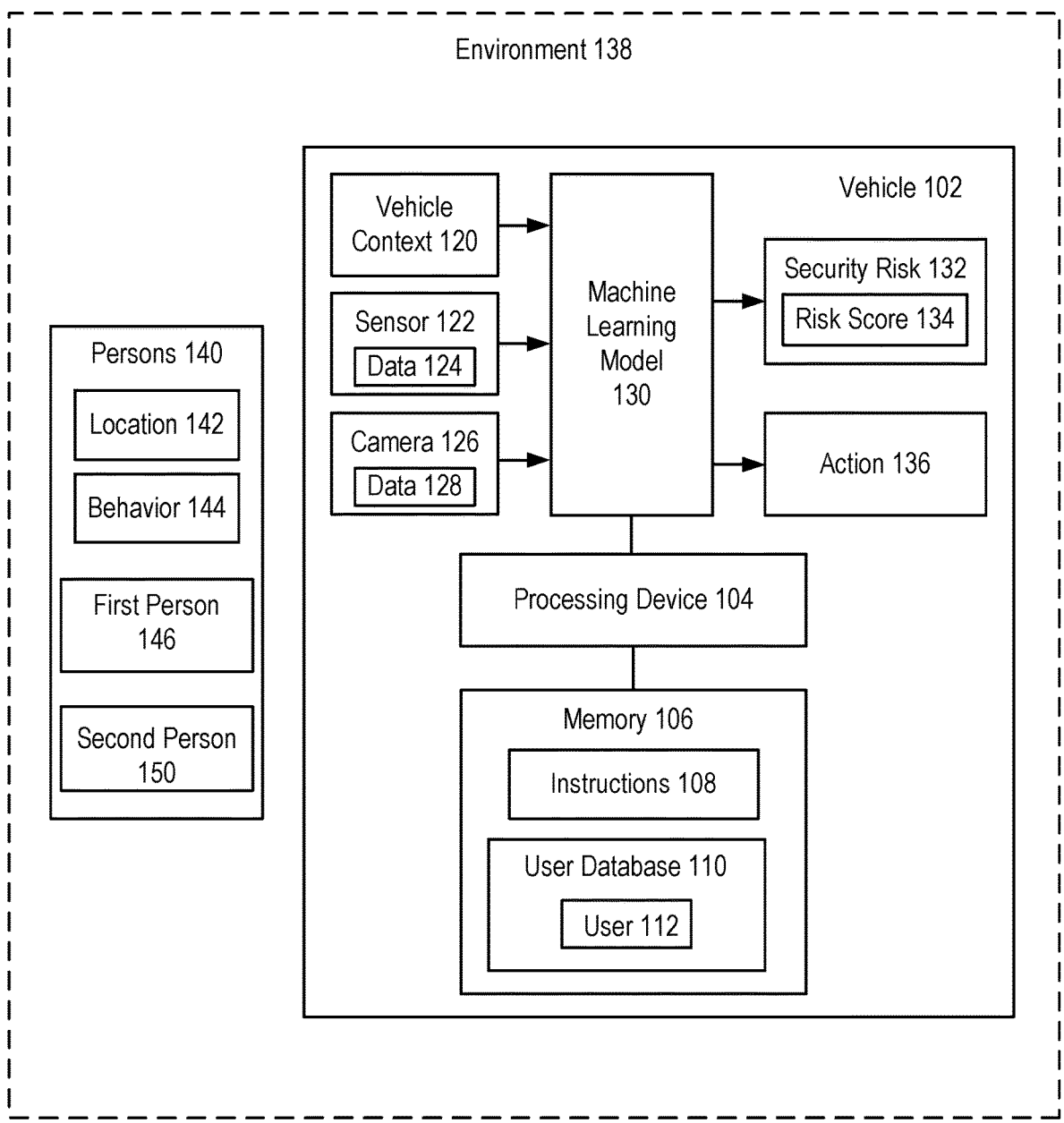
FIG. 1 shows a vehicle configured to detect one or more persons in an environment of the vehicle, and to perform one or more actions if a security risk is detected, in accordance with some embodiments.

The following disclosure describes various embodiments for a driver recognition system that performs one or more actions for a vehicle in response to determining a security risk (e.g., when the driver is determined to be approaching the vehicle and a stranger is following closely behind the driver). In one example, a person that is approaching a vehicle is identified as being the driver or an authorized user. In one example, the identification of a driver is performed by a computing device of a manually-driven vehicle. In one example, the identification of an authorized user of an autonomous vehicle is performed. In one example, the manually-driven or autonomous vehicle is a car, an aircraft, or a watercraft. In one example, an approaching stranger is detected, and data collected by sensors of the vehicle regarding the stranger do not match any stored records in a vehicle and/or other database. Thus, the stranger is considered to be a security risk. In response to determining that the stranger poses a security risk, one or more various actions to improve security of the vehicle configuration are performed.

In prior vehicles, a configuration of the vehicle set by a driver remains the same regardless of the situation in which the vehicle may be present. In some cases, when a driver is approaching a vehicle, the environment in which the vehicle and/or driver are located is unsafe. For example, in an unsafe neighborhood, a stranger might be closely following the driver as the driver approaches his or her vehicle. However, the prior vehicle performs actions in response to the driver in an unsafe situation such as the foregoing in the same manner as for normal, safe situations that the driver typically encounters. This creates a technical problem in which the configuration of the vehicle is inappropriate for the environment in which the vehicle is presently located (or for another unsafe context of the vehicle). This can create a dangerous situation for the driver due to inability of the vehicle to safely respond to a security risk (e.g., a dangerous situation).

In one example, prior vehicles may open all doors of the vehicle in response to a driver command (e.g., a clicking of a button on a wireless key fob). However, if the driver is in an unsafe situation when approaching the vehicle, the opening of all doors creates a safety hazard. In another example, the opening of all doors of the vehicle more readily permits unauthorized access by a stranger, such as a criminal that is near the vehicle when the driver is entering the vehicle.

Various embodiments of the present disclosure provide a technological solution to the above technical problem. In one embodiment, a vehicle monitors its environment (e.g., the surroundings of the vehicle) to evaluate a security risk (e.g., determine a risk score using an artificial intelligence (AI) system). Vehicle functions or operations that are normally performed automatically for a recognized driver can be adjusted or delayed based on determining the existence of a security risk.

In one example, when a driver or authorized user (e.g., owner) is accompanied by one or more strangers, the vehicle may automatically delay the unlocking of the vehicle and/or starting-up of the vehicle. In one example, the vehicle may unlock only the door that is ready to be accessed by the recognized driver, but not others such as the strangers.

In one embodiment, a method comprises: collecting data corresponding to a person that is approaching a vehicle; determining, based on the collected data, whether the person is associated with the vehicle; in response to determining that the person is a first user associated with the vehicle, determining a security risk (e.g., the presence of a stranger near the driver) based on monitoring an environment of the vehicle; and in response to determining the security risk, performing at least one action for the vehicle.

In one example, the environment is monitored using sensors of the vehicle, such as one or more cameras. Image data collected by the cameras is analyzed using facial recognition to identify one or more persons. A first person can be identified as a user having corresponding feature data stored in the user database. However, the second person is not able to be identified based on any data in the user database or any data obtained from a search request sent via wireless communication to a remote server. Thus, the second person is deemed to be a stranger and to present a security risk.

In one embodiment, when a person is deemed to be a stranger, a risk score is determined based on the context of the vehicle and the approaching one or more persons. In one embodiment, the risk score is compared to a predetermined threshold. If the risk score exceeds the threshold, then a security risk is deemed to exist and one or more actions are performed for the vehicle. In one embodiment, the risk score is generated by providing inputs to a machine-learning model. In one example, the inputs include data regarding the context of the vehicle. In one example, the data regarding context can include a location of the vehicle, sensor data previously collected by the vehicle and/or other vehicles at the location, and/or a time of day.

In one embodiment, a vehicle includes other sensors such as light detection and ranging (LiDAR) sensors and radar sensors. In one example, a LiDAR sensor detects an approaching person. This detection triggers additional data collection regarding the person. In one example, the additional data collection includes activating at least one sensor to perform data collection targeted at the approaching person. In one example, a camera is activated and a field of view of the camera is adjusted to target the approaching person.

In one embodiment, various actions can be performed in response to determining that a stranger is approaching and/or a security risk exists. In one example, an authentication mechanism is activated to attempt to identify the stranger using an alternative approach. In one example, the alternative approach is sending of a wireless communication to a mobile device of the stranger.

In one embodiment, the actions that are performed can include one or more of delaying the unlocking of one or more doors, delaying the starting of the vehicle, disabling the starting of the vehicle, activating an alarm, or notifying an owner of the vehicle by sending a wireless communication to a computing device (e.g., a communications server that communicates with a mobile device of the owner).

In one embodiment, when a person approaches a vehicle, a camera of the vehicle recognizes the person as a driver/owner or other authorized user associated with the vehicle (e.g., a family member of the driver). In response to recognizing the person, the vehicle determines a security risk (e.g., a risk based on a presence and/or activities of a stranger nearby). In one example, a risk score is determined. In response to determining that a risk score exceeds a predetermined threshold, various actions are performed including locking a door of the vehicle, booting up a computer system of the vehicle, turning on an electrical and/or mechanical system of the vehicle, launching applications to be used by the driver while approaching and/or inside the vehicle, and/or adjusting settings of the vehicle specifically for the driver to provide improved security as compared to a normal mode of operation of the vehicle.

In one embodiment, a vehicle includes one or more cameras (e.g., mounted on the exterior of the vehicle, or otherwise mounted to capture images external to the vehicle). A memory device of the vehicle stores a user database of users that are authorized to operate the vehicle. A computing device (e.g., a controller) of the vehicle collects data using the camera(s). The collected data corresponds to a person (e.g., a driver) and to a stranger that have each been detected as approaching the vehicle. In one example, a sensor other than one of the cameras is used to detect that the person is approaching. In response to detection by the sensor, one or more of the cameras are activated to start collecting image data that will be analyzed by the computer device.

In one embodiment, the computing device determines, based on the collected data, that one of the approaching persons is an authorized user in the user database. In contrast, a detected stranger is not located in the user database, and is therefore considered to be a security risk. In response to determining that the person is an authorized user and that a security risk exists, one or more actions are performed for the vehicle (e.g., the preparation of the vehicle discussed above).

In one embodiment, a person recognition technique is used that does not require that the driver or other persons look directly into a camera in order to be identified (e.g., a profile is sufficient). In some embodiments, a camera is not required to identify an approaching person. In some embodiments, facial data for a stranger can be matched to a list of persons known to be a security risk (e.g., a person that has previously engaged in unauthorized activity associated with the vehicle, such as unauthorized entry or undesired contact with the vehicle) (e.g., undesired contact includes undesired pushing on the vehicle by a person to cause excessive rocking, as detected by an accelerometer of the vehicle).

In one example, an artificial neural network (ANN)-based recognizer analyzes the way that a person approaches the vehicle in connection with other inputs (e.g., time, location, routing) to make a determination regarding an identity (e.g., driver or stranger) of the person. In one embodiment, the ANN is trained using data obtained from a period of usage of the vehicle. In one example, a new car does not have to recognize the owner immediately, or even in a day or two, but then recognizes the owner after a predetermined period (e.g., 5 days) of usage, or after a number of uses of the vehicle (e.g., as measured by engine or motor start-up or activation).

In general, an ANN may be trained using a supervised method where the parameters in the ANN are adjusted to minimize or reduce the error between known outputs resulted from respective inputs and computed outputs generated from applying the inputs to the ANN. Examples of supervised learning/training methods include reinforcement learning, and learning with error correction.

Alternatively, or in combination, an ANN may be trained using an unsupervised method where the exact outputs resulting from a given set of inputs are not known before the completion of training. The ANN can be trained to classify an item into a plurality of categories, or data points into clusters. Multiple training algorithms can be employed for a sophisticated machine learning/training paradigm.

In one example, an artificial neural network may be configured as an ANN or as a convolutional neural network (CNN) that is trained using reinforcement learning. For example, the ANN may gather images, voice recordings, and other sensor data for persons approaching the vehicle and store the data in a database during a training period. When a person enters the driver's seat during the training period, the person is identified in the database as an authorized user and the data for that person is reinforced in the ANN. During the training period the machine-learning model will take in new data from sensors on the vehicle for authorized users (e.g., changes in appearance (clothing, glasses, facial hair, etc.), different lighting conditions, different angles, etc.) and will learn and reinforce recognition of authorized users.

In one example, an ANN may use data from a social network server to identify persons connected with authorized users of a vehicle. For example, after an authorized user has been identified, the ANN may gather information about people (e.g., relatives or friends) associated with the authorized user from a social network server (e.g., Facebook, Instagram, Twitter, etc.). The ANN may add this data to the user database and the machine-learning module may use this information to recognize people associated with the authorized user.

In one embodiment, more than one person may approach a vehicle simultaneously. In one example, the vehicle is configured for the authorized person that is determined by a controller of the vehicle to be nearest to the driver's door of the vehicle. In one example, a door that is nearest to a person determined to be a stranger is locked, but a door that is nearest to a person determined to be a driver is unlocked. In one example, the driver's door is not unlocked until the driver is within a predetermined distance of the vehicle.

In one embodiment, data collected by one or more cameras is used to determine a location of the driver relative to the vehicle, and to open one or more selected doors based on the location of the user. In one embodiment, the location of a stranger is determined. The opening of the selected door can be conditional on the stranger being at least a predetermined distance away from the selected door and/or the vehicle.

In one embodiment, a first camera faces towards one side (e.g., a left side) of the vehicle, and a second camera faces towards an opposite side (e.g., a right side) of the vehicle. Image data collected by the cameras is provided as an input into facial recognition software. The facial recognition software is trained for each of several authorized users. A database of user data is accessed by a computing device that is running the facial recognition software.

After positive detection and/or identification of a user is made, security preferences are accessed in the user database. These security preferences (e.g., implemented as a secure mode of operation) may include a secure manner of operation. In one example, the security preferences include settings to software, knobs, switches, controls, etc.

In one embodiment, when a security risk is identified, one or more functions of the vehicle available in the normal mode are disabled and/or re-configured for improved driver or user security.

In one embodiment, the vehicle is configured for the identified, approaching stranger based on a security profile. In one example, a classification of the stranger is performed. One of several stored security profiles is selected based on the classification. Each security profile includes one or more actions that are performed in response to determining a security risk associated with the stranger. In one example, these actions include locking or unlocking selected door(s), adjusting a seat, adjusting mirrors, selecting a communication channel, activating a tracking beacon of the vehicle, setting a vehicle mode of operation, etc.

In one embodiment, the image data collected by one or more cameras is transmitted to a central server (e.g., that serves multiple vehicles) using wireless communication. The central server performs an identification process and transmits an identification of a person (e.g., for a driver and/or stranger) back to the vehicle. The identification of the person can be based on a machine-learning model executing on the server. In one embodiment, the machine-learning model is trained using data from other vehicles that are used by the person. In one example, the other vehicles communicate with the server.

FIG. 1 shows a vehicle 102 configured to detect one or more persons 140 in an environment 138 of the vehicle, and to perform one or more actions if a security risk is detected and/or determined, in accordance with some embodiments. In one example, the environment 138 is a predetermined spatial region around the vehicle 102 (e.g., a predetermined radius or other distance away from the vehicle).

In one embodiment, vehicle 102 uses a machine-learning model 130 to identify one or more security risks 132 associated with a person that is detected as approaching the vehicle 102 (e.g., a first person 146 and/or a second person 150) (e.g., a user of the vehicle 102). In one example, vehicle environment 138 includes various persons outside the vehicle that are near or approaching the vehicle (e.g., persons within a predetermined distance of the vehicle). Vehicle environment 138 may include persons 140 for which data is collected as persons 140 are approaching or detected near the vehicle 102.

Vehicle 102 includes a processing device 104. In one embodiment, the processing device 104 uses a machine-learning model 130 and a user database 110, along with input from camera(s) 126, and/or sensor(s) 122, and/or information about the vehicle context 120 to implement security in response to determining a security risk (e.g., to put vehicle 102 into a security mode for recognized drivers). The processing device 104 may be, for example, a microprocessor, graphics processor, embedded processor, embedded computer, system on a chip, ASIC, FPGA, or other processing device.

Vehicle 102 contains memory 106 connected to the processing device 104. Memory 106 may be non-volatile memory or a combination of non-volatile and volatile memories. For example, memory 106 may contain flash memory (e.g., SLC, MLC, TLC, QLC, etc.), 3D XPoint memory, DRAM, SRAM, other memory technologies, or any combination of memory technologies. Memory 106 may be in any form including, for example, solid-state disk, compact flash module, PCIe card, NVMe module, DIMM, SIMM, soldered to a motherboard, or other formfactor.

Memory 106 contains instructions 108 used by the processing device 104 to implement security for recognized drivers. Instructions 108 may include, for example, instructions the processing device 104 uses in collecting data (e.g., camera data 128, or sensor data 124), determining the vehicle context 120, or the context of one or more person(s) 140 approaching the vehicle 102 (e.g., geographic location, time of day, etc.), or processing the data (e.g., using the machine-learning model 130), and taking one or more action(s) 136 when a driver is recognized and a security risk 132 is determined.

The memory 106 also contains user database 110. User database 110 contains information about each user 112 that is associated with the vehicle 102 (e.g., user 112 may be a driver, a family member of the driver, and/or a friend of the driver as determined from wireless communications by processing device 104 with a social network server). The user database 110 may be one of many types of database. For example, user database 110 may be a relational database or non-relational database, and may use any structure and access method (e.g., SQL, NoSQL, XML, etc.). In one embodiment, the user database 110 is stored in the same memory 106 as the instructions 108. In one embodiment, the user database 110 and instructions 108 are stored in separate memory devices. In one embodiment, the user database 110 is spread across multiple memory devices.

The user database 110 contains information about each user 112 associated with the vehicle 102. User data may include, for example, data used to identify user 112, data used to identify persons 140 associated with the user 112 (e.g., family members of the user, and/or friends of the user), and data about a user 112. For example, data used to identify a user 112 may include biometric data, such as facial features, height, body build, hair color, etc. and behavioral data, such as posture, gait, voiceprint, etc. Data about a user 112 may include, for example, name, address, contact information, etc. associated with the user 112.

Data inputs used by the system (e.g., inputs used in machine-learning model 130) may come from many sources including, for example, data 128 from one or more camera(s) 126, data 124 from one or more sensor(s) 122, the vehicle context 120, and other data regarding the context of person(s) 140 approaching or near the vehicle 102.

Data 128 from camera(s) 126 may include, for example, still pictures or video data of person(s) 140 approaching the vehicle 102. Data 124 from sensor(s) 122 may include, for example, the location 142 of one or more person(s) 140 relative to the vehicle 102, or voiceprint data or commands from person(s) 140 speaking near the vehicle 102. The vehicle context 120 and context of person(s) 140 approaching or near the vehicle 102 may include, for example, data regarding the time of day, location of the vehicle 102, prior route travelled by the vehicle 102 (e.g., route used to reach the current location of vehicle 102), location(s) 142 of person(s) 140 relative to each other, etc.

The camera(s) 126 and sensor(s) 122 may gather information about person(s) 140 approaching or near the vehicle 102. For example, this may include features of the person(s) 140 (e.g., facial features, height, body build, hair color, whether the person carrying weapons, etc.), and behavior 144 of the person(s) 140 (e.g., posture, gait, language, vocal tone, voiceprint, threatening gestures or movements, etc.).

Processing device 104 may use machine-learning model 130 for making decisions regarding security actions 136 to perform if a security risk 132 is determined. The machine-learning model 130 may learn about user(s) 112 associated with the vehicle 102, including, for example, features (e.g., facial features, height, body build, hair color, etc.), behavior 144 (e.g., posture, gait, voiceprint, etc.), and social connections (e.g., family members of the user, and/or friends of the user) and may store such data in the user database 110. The machine-learning model 130 may take data, such as, for example, camera data 128, sensor data 124, vehicle context 120, and data from user database 110 as input, and run algorithms (e.g., facial recognition, behavior recognition, voice recognition, etc.) in determining whether person 140 is a user 112 associated with the vehicle 102. The machine-learning model 130 may be trained to recognize user(s) 112 associated with vehicle 102 for a predetermined time period before security for recognized drivers is activated. In one embodiment, if features for an approaching person are not matched to any person in the user database, the approaching person is deemed to be a stranger.

In one embodiment, the system identifies person(s) 140 associated with the vehicle 102 as first person(s) 146. Person(s) 140 not associated with the vehicle 102 are identified as second person(s) 150 (e.g., persons deemed to be a stranger due to failure to obtain a match to user database 110 of the vehicle 102). The machine-learning model 130 may use inputs, such as, for example, camera data 128 and/or sensor data 124 to identify threats from second person(s) 150 (e.g., determining whether the person(s) are carrying weapons, and/or whether their behavior shows threatening gestures or patterns of movement, posture, gait, language, or vocal tone, etc.). The machine-learning model 130 generates a risk score 134 based on identifying a perceived security risk 132 to first person(s) 146.

Vehicle 102 may take one or more action(s) 136 based on the risk score 134. For example, if the risk score 134 is below a predetermined threshold, vehicle 102 may take actions 136, such as, unlock one or more doors, and/or open one or more doors, determine the vehicle context 120 and select and launch software based on the vehicle context 120, and configure the vehicle 102 in a normal operation mode. In normal operation mode, vehicle 102 provides a set of vehicle functions for the first user.

If the risk score 134 is above a predetermined threshold, vehicle 102 may configure the vehicle in a secure operation mode. In the secure operation mode, vehicle 102 may take actions 136. The actions 136 can include, for example, unlocking only the door closest to the location 142 of the first user, locking all other doors, activating an alarm, delaying starting a component of the vehicle 102 until the first user is inside the vehicle and all the doors are locked, sending a wireless communication from the vehicle 102 to a computing device, sending a wireless communication with data about the security risk 132 from the vehicle 102 to a server, sending a wireless communication requesting software configured to respond to the security risk 132 from the vehicle 102 to a server, sending data regarding the second person 150 to a server configured to perform facial recognition, sending a message to a user device of the first person 146, and/or prohibiting availability of a portion of vehicle 102 functions to any user.

Figure 2:
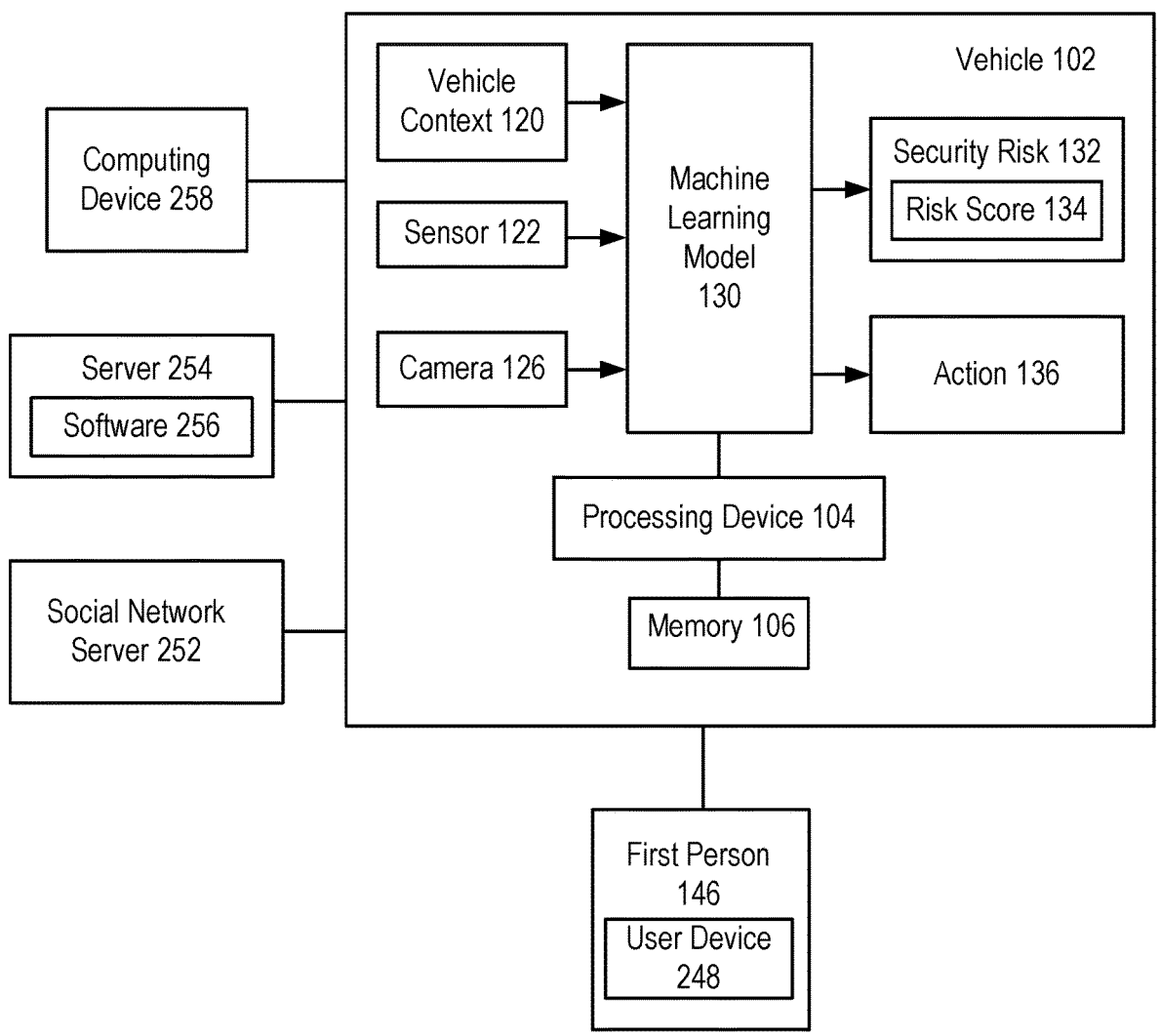
FIG. 2 shows the vehicle of FIG. 1 configured to interact with one or more various computing devices such as a social network server, in accordance with some embodiments.

FIG. 2 shows the vehicle 102 of FIG. 1 configured to interact with one or more various computing devices such as a social network server 252, in accordance with some embodiments. In one embodiment, vehicle 102 uses a wireless communication interface (not shown) (e.g., a radio that implements 5G communications) to communicate with social network server 252 in response to identifying first person 146. Processing device 104 causes data regarding first-person 146 to be transmitted to social network server 252. In response, social network server 252 returns data regarding one or more friends of first person 146. This friend data is added to user database 110 (see FIG. 1) for use in determining matches to other persons that are approaching vehicle 102.

In one embodiment, in response to risk score 134 exceeding a predetermined threshold, processing device 104 causes a wireless communication (e.g., a message) to be sent to user device 248 of first-person 146. The wireless communication includes data regarding the determined security risk 132. In one embodiment, user device 248 can be used to select a security mode to be implemented for vehicle 102. The selected security mode is transmitted from user device 248 to vehicle 102. Then, processing device 104 causes one or more actions 136 on the vehicle 102 (e.g., in order to implement the selected security mode).

In one embodiment, in response to determining a security risk, a wireless communication is sent to server 254. The communication includes a request regarding software 256 of server 254. In one example, in response to receiving the request, server 254 sends a copy of software 256 for downloading by vehicle 102. Processing device 104 installs and executes the copy to perform various security actions on vehicle 102.

In one embodiment, in response to determining a security risk, a wireless communication is sent to computing device 258. In one example, computing device 258 is a controller in a different vehicle. In one example, the controller navigates the different vehicle away from the location of vehicle 102 (e.g., to avoid exposure to a security risk that has been identified by vehicle 102 and/or server 254).

Figure 3:
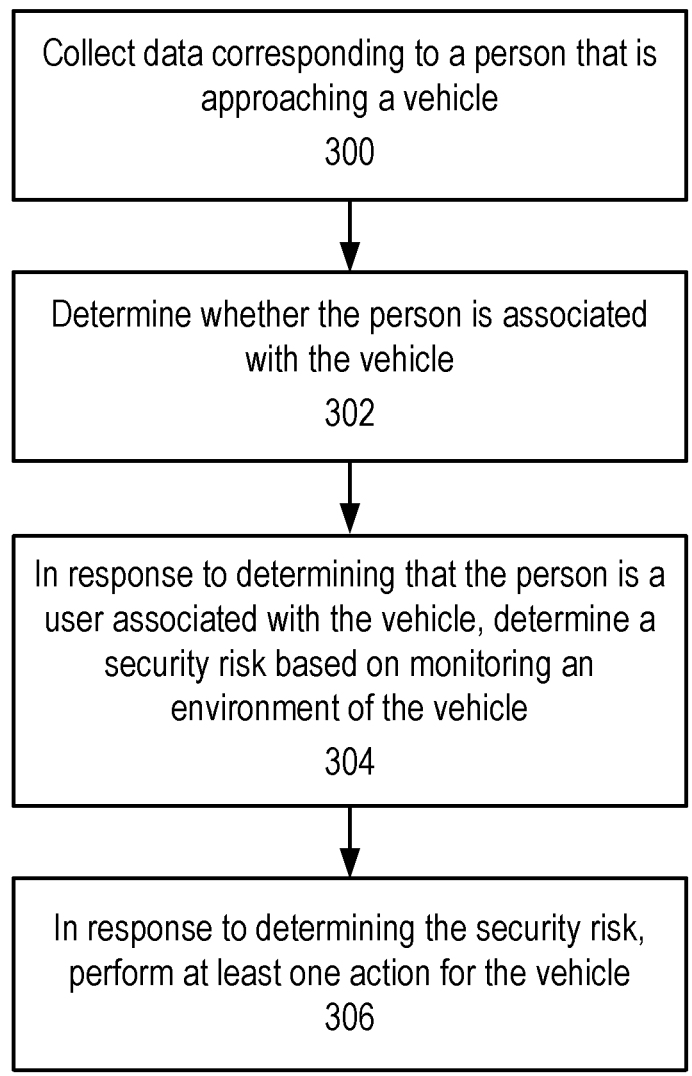
FIG. 3 shows a method for performing one or more actions for a vehicle based on determining a security risk when one or more persons are approaching the vehicle, in accordance with some embodiments.

FIG. 3 shows a method for performing one or more actions for a vehicle based on determining a security risk when one or more persons are approaching the vehicle, in accordance with some embodiments. For example, the method of FIG. 3 can be implemented in the system of FIGS. 1-2. In one example, the persons are persons 140 approaching vehicle 102. In one example, the actions are actions 136 that are caused in response to security-response software executing on a processing device 104.

The method of FIG. 3 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 3 is performed at least in part by one or more processing devices (e.g., processing device 104 of FIGS. 1-2).

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 300, data is collected that corresponds to one or more persons that are approaching a vehicle. In one example, data 124, 128 is collected by sensor 122 and camera 126. In one example, data 128 is image data that includes facial features for first person 146 and/or second person 150.

At block 302, a determination is made whether each of the approaching persons is associated with the vehicle. In one example, machine-learning model 130 uses facial recognition to determine if first person 146 and/or second person 150 is a user of vehicle 102. In one example, machine-learning model 130 determines that an approaching person (e.g., second person 150) is an unknown person (stranger) that is not associated with vehicle 102.

At block 304, in response to determining that the person is a user associated with the vehicle, a security risk is determined based on monitoring an environment of the vehicle. In one example, processing device 104 determines that first person 146 is a driver of vehicle 102. In one example, processing device 104 determines that a security risk 132 exists. In one example, a security risk is evaluated after determining that first person 146 is an authorized user of vehicle 102.

At block 306, in response to determining the security risk, one or more actions for the vehicle are performed. In one example, the actions include unlocking a door, locking the door, disabling a vehicle, delaying the start of the vehicle, or starting an engine. In one example, in response to determining a security risk, a policy corresponding to the security risk is determined. In one example, the policy is selected from multiple policies stored in memory 106. In one example, the policy includes a set of actions that are performed in response to a security risk.

In one embodiment, a method comprises: collecting data corresponding to a person (e.g., person 146, 150) that is approaching a vehicle (e.g., vehicle 102); determining, based on the collected data, whether the person is associated with the vehicle; in response to determining that the person is a first user associated with the vehicle, determining a security risk (e.g., security risk 132) based on monitoring an environment (e.g., environment 138) of the vehicle; and in response to determining the security risk, performing at least one action for the vehicle.

In one embodiment, monitoring the environment comprises collecting first data (e.g., data 124, 128) associated with the environment of the vehicle, and determining the security risk comprises evaluating the first data.

In one embodiment, the collected first data is evaluated based on an output from a machine-learning model (e.g., machine-learning model 130), and the collected first data is used as an input to the machine-learning model.

In one embodiment, determining the security risk comprises determining a presence in the environment of an unknown person.

In one embodiment, performing the at least one action comprises: determining a location of the first user; selecting a door of the vehicle that is closest to the first user; and opening the selected door.

In one embodiment, performing the at least one action comprises: determining a location of the first user; determining a first door of the vehicle that is closest to the first user; and locking all doors of the vehicle other than the first door.

In one embodiment, performing the at least one action comprises sending a wireless communication to a server (e.g., server 254). The communication comprises data regarding the security risk (e.g., data regarding facial features of person 146, 150).

In one embodiment, performing the at least one action comprises: sending, via wireless communication, a request to a server for software (e.g., software 256), wherein the software is configured to respond to the security risk; receiving the software from the server; storing the software in at least one memory (e.g., memory 106) of the vehicle; and executing, by a controller (e.g., processing device 104 implemented as controller) of the vehicle, the software. In one example, the software is security remediation software.

In one embodiment, the method further comprises: in response to determining an absence of a security risk, configuring the vehicle for operation in a normal mode that provides a set of vehicle functions for the first user; wherein performing the at least one action comprises configuring the vehicle for operation in a secure mode; and wherein the operation in the secure mode prohibits availability to any vehicle user of at least a portion of the set of vehicle functions provided in the normal mode.

In one embodiment, performing the at least one action comprises delaying starting of a vehicle component until the first user is located in the interior of the vehicle and all doors of the vehicle are locked.

In one embodiment, determining the security risk comprises determining a risk score (e.g., risk score 134) and comparing the risk score to a predetermined threshold.

In one embodiment, the method further comprises: collecting sensor data from at least one sensor (e.g., sensor 122) of the vehicle; wherein the risk score is determined based on an output from a machine-learning model, and the collected sensor data is an input to the machine-learning model.

In one embodiment, the data corresponding to the person is collected by at least one camera (e.g., camera 126) of the vehicle, and determining whether the person is associated with the vehicle comprises performing facial recognition.

In one embodiment, determining the security risk comprises determining a presence in the environment of a person that is not associated with the first user as determined by accessing at least one database (e.g., user database 110).

In one embodiment, a system comprises: at least one sensor; at least one memory (e.g., memory 106) configured to store a database of persons associated with a vehicle; and at least one processing device (e.g., processing device 104); the at least one memory containing instructions (e.g., software instructions 108) configured to instruct the at least one processing device to: collect data using the at least one sensor, wherein the collected data corresponds to a first person (e.g., first person 146) and a second person (e.g., second person 150) that are each approaching the vehicle; determine, based on the collected data and by accessing the database, that the first person is associated with the vehicle, and that the second person is not associated with the vehicle; and in response to determining that the second person is not associated with the vehicle, perform at least one action.

In one embodiment, performing the at least one action comprises at least one of activating an alarm of the vehicle, sending a wireless communication from the vehicle to a computing device (e.g., computing device 258), sending a message to a user device (e.g., user device 248) of the first person, opening or closing at least one door, locking or unlocking at least one door, disabling or delaying a function of the vehicle, or sending data regarding the second person to a server (e.g., server 254) configured to perform facial recognition.

In one embodiment, the instructions are further configured to instruct the at least one processing device to determine a behavior (e.g., behavior 144) of the second person, wherein the behavior comprises a pattern of movement by the second person, and the at least one action performed is selected based on the determined behavior.

In one embodiment, the instructions are further configured to instruct the at least one processing device to: determine a context (e.g., vehicle context 120) of the vehicle; wherein performing the at least one action comprises selecting software based on the context, and launching the selected software. In one example, the software is selected by processing device 104 from one of a plurality of applications stored in memory 106. The software is selected based on a classification of the security risk.

In one embodiment, the persons associated with the vehicle in the database comprises persons that are in a social network of the first person, and the persons in the social network are determined by communication of a controller of the vehicle with at least one social network server (e.g., social network server 252).

In one embodiment, a non-transitory computer-readable medium (e.g., memory 106) stores instructions which, when executed on a computing device, cause the computing device to at least: collect data corresponding to a person that is approaching a vehicle; determine, based on the collected data, whether the person is a driver of the vehicle; in response to determining that the person is a driver of the vehicle, determine a security risk based on monitoring an environment of the vehicle; and in response to determining the security risk, perform at least one action for the vehicle.

The disclosure includes various devices which perform the methods and implement the systems described above, including data processing systems which perform these methods, and computer-readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and operations may be described as being performed by or caused by software code to simplify description. However, those skilled in the art will recognize what is meant by such expressions is that the functions result from execution of the code by one or more processors, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include but are not limited to recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
    training a machine-learning model using prior data collected for an authorized first user of a vehicle;
    collecting sensor data from at least one sensor of the vehicle;
    collecting data corresponding to a person that is approaching the vehicle;
    determining, based on the collected data, whether the person is associated with the vehicle;
    determining a context of the vehicle, including a time of day, a current location of the vehicle, a route used by the vehicle to reach the current location, and a presence of other vehicles at the current location;
    in response to determining that the person is the first user, determining a security risk based on monitoring an environment of the vehicle, wherein the security risk is determined based on an output from the machine-learning model, and wherein the machine-learning model has inputs including the determined context and the sensor data; and
in response to determining the security risk, performing at least one action for the vehicle.

2. The method of claim 1, wherein monitoring the environment comprises collecting first data associated with the environment of the vehicle, and determining the security risk comprises evaluating the first data.

3. The method of claim 2, wherein:
the collected first data includes at least one image and at least one sound recording for the person that is approaching the vehicle; and
the collected first data is used as an input to the machine-learning model.

4. The method of claim 1, wherein determining the security risk comprises determining a presence in the environment of an unknown person.

5. The method of claim 1, wherein performing the at least one action comprises:
determining a location of the first user;
selecting a door of the vehicle that is closest to the first user; and
opening the selected door.

6. The method of claim 1, wherein performing the at least one action comprises:
determining a location of the first user;
determining a first door of the vehicle that is closest to the first user; and
locking all doors of the vehicle other than the first door.

7. The method of claim 1, wherein performing the at least one action comprises sending a wireless communication to a server, the communication comprising data regarding the security risk.

8. The method of claim 1, wherein performing the at least one action comprises:
sending, via wireless communication, a request to a server for software, wherein the software is configured to respond to the security risk;
receiving the software from the server;
storing the software in at least one memory of the vehicle; and
executing, by a controller of the vehicle, the software.

9. The method of claim 1, further comprising:
in response to determining an absence of a security risk, configuring the vehicle for operation in a normal mode that provides a set of vehicle functions for the first user;
wherein performing the at least one action comprises configuring the vehicle for operation in a secure mode; and
wherein the operation in the secure mode prohibits availability to any vehicle user of at least a portion of the set of vehicle functions provided in the normal mode.

10. The method of claim 1, wherein performing the at least one action comprises delaying starting of a vehicle component until the first user is located in the interior of the vehicle and all doors of the vehicle are locked.

11. The method of claim 1, wherein determining the security risk comprises determining a risk score and comparing the risk score to a predetermined threshold.

12. The method of claim 11, wherein the risk score is determined based on the output from the machine-learning model.

13. The method of claim 1, wherein the data corresponding to the person is collected by at least one camera of the vehicle, and determining whether the person is associated with the vehicle comprises performing facial recognition.

14. The method of claim 1, wherein determining the security risk comprises determining a presence in the environment of a person that is not associated with the first user as determined by accessing at least one database.

15. A system comprising:
at least one sensor;
at least one memory configured to store a database of persons associated with a vehicle; and
at least one processing device;
the at least one memory containing instructions configured to instruct the at least one processing device to:
train a machine-learning model using prior data collected for a first person that is associated with the vehicle;
collect sensor data using the at least one sensor, wherein the collected sensor data corresponds to the first person and a second person that are each approaching the vehicle;
determine, based on the collected sensor data and by accessing the database, that the first person is associated with the vehicle, and that the second person is not associated with the vehicle;
determine a context of the vehicle, including at least a route used by the vehicle to reach the current location;
determine a security risk based on an output from the machine-learning model, wherein the machine-learning model has inputs including the determined context and the sensor data; and
in response to determining that the second person is not associated with the vehicle, perform, based on the security risk, at least one action, wherein performing the at least one action comprises selecting software based on the determined context, and launching the selected software.

16. The system of claim 15, wherein performing the at least one action further comprises at least one of activating an alarm of the vehicle, sending a wireless communication from the vehicle to a computing device, sending a message to a user device of the first person, opening or closing at least one door, locking or unlocking at least one door, disabling or delaying a function of the vehicle, or sending data regarding the second person to a server configured to perform facial recognition.

17. The system of claim 15, wherein the instructions are further configured to instruct the at least one processing device to determine a behavior of the second person, wherein the behavior comprises a pattern of movement by the second person, and the at least one action performed is selected based on the determined behavior.

18. The system of claim 15, wherein the persons associated with the vehicle in the database include persons that are in a social network of the first person, and wherein the persons in the social network are determined by communication of a controller of the vehicle with at least one social network server.

19. A non-transitory computer-readable medium storing instructions which, when executed on a computing device, cause the computing device to at least:
train a machine-learning model using prior data collected for an authorized driver of a vehicle;
collect sensor data corresponding to a person that is approaching a vehicle;
determine, based on the collected sensor data, whether the person is the authorized driver;
determine a context of the vehicle, including at least a route used by the vehicle to reach the current location;

in response to determining that the person is the authorized driver, determine a security risk based on monitoring an environment of the vehicle, wherein the security risk is determined based on an output from the machine-learning model, and wherein the machine-learning model has inputs including the determined context and the sensor data;

determine a classification of the security risk; and in response to determining the security risk, select software based on the classification, and launch the selected software.

* * * * *